United States Patent [19]
Iguchi

[11] Patent Number: 5,520,468
[45] Date of Patent: May 28, 1996

[54] OIL FEEDING ARRANGEMENT FOR SHAFT SEAL AND BEARINGS

[75] Inventor: Yuichi Iguchi, Tokyo, Japan

[73] Assignee: Ishikawajima-Harima Heavy Industries Co., Ltd., Japan

[21] Appl. No.: 388,771

[22] Filed: Feb. 15, 1995

[30] Foreign Application Priority Data

Feb. 21, 1994 [JP] Japan .................................. 6-022565

[51] Int. Cl.⁶ .................................................. F16C 33/66
[52] U.S. Cl. .......................................... 384/473; 384/474
[58] Field of Search ................................... 384/473, 474, 384/484, 462, 403, 148

[56] References Cited

U.S. PATENT DOCUMENTS

| | | | |
|---|---|---|---|
| 4,575,265 | 3/1986 | Tooley | 384/474 |
| 4,784,500 | 11/1988 | Prokop | 384/474 |
| 4,854,748 | 8/1989 | Gabelli et al. | 384/474 |
| 5,114,248 | 5/1992 | Harsdorff | 384/474 |

FOREIGN PATENT DOCUMENTS

| | | |
|---|---|---|
| 196180 | 2/1958 | Austria . |
| 61-085030 | 9/1986 | Japan . |
| 549207 | 4/1942 | United Kingdom . |

Primary Examiner—Lenard A. Footland
Attorney, Agent, or Firm—Dykema Gossett

[57] ABSTRACT

A bearing is located in a bore formed in a casing for rotatably supporting a shaft extending inside the casing and a shaft seal is located between the shaft and the bearing bore and spaced from the bearing in a longitudinal direction of the shaft. An oil chamber is defined by the shaft seal and the bearing. An oil feed hole is formed in the casing for directly feeding an oil into the oil chamber from an oil source. The oil is then directed to the bearing from the oil chamber. A partition plate is placed in the oil chamber to form a gap between the shaft and itself (partition plate) for allowing part of the oil to flow to the bearing from the oil chamber through the gap and allowing the remainder of the oil to be dammned by the partition plate to form an oil pool in which the shall seal is always immersed.

3 Claims, 2 Drawing Sheets

OIL FEEDING ARRANGEMENT FOR SHAFT SEAL AND BEARINGS

BACKGROUND OF THE INVENTION

1. Technical Field

The present invention relates to an oil feeding arrangement for a shaft seal and a bearing.

2. Background Art

A supercharger is known as a means for raising a drive power (horsepower) of a vehicle engine. The supercharger supercharges an air to the engine using a rotational force of the engine.

FIG. 3 of the accompanying drawings illustrates part of a conventional supercharger. In this illustration, a rotary shaft 3 extends in a shaft opening 2 of a casing 1 and is rotatably supported in the casing 1 by bearings 4 and 5 at its part close to one end thereof and by bearings 8 and 9 via a boss 6 and a shock absorption member 7 at the other end. A dumper pulley 10 is fixed on the boss 6 and the absorption member 7 along their periphery. The dumper pulley 10 is connected with an engine (not shown) by means of a belt 11 indicated by a single dot line and is driven by the engine. The absorption member 7 softens or absorbs an impact force from the engine when a power is transmitted to the shaft 3 from the engine via the belt 11 and the pulley 10. The absorption member 7 may be a rubber disc.

At the rightmost and of the shaft 3, mounted is a step-up or speed-up wheel 12. The wheel 12 has a gear 12a along its periphery. The gear 12a engages with another gear 13a mounted on one end of a shaft 13 of an F rotor (not shown). The shaft 13 extends in parallel to the shaft 3. The shaft 13 is rotatably supported in a bore 16 of the casing 1 via bearings 14 and 15. The shaft 13 is provided with an F timing gear 17 which engages with an M tinning gear 19 fixed at one end of a third shaft 18 of an M rotor (not shown). The shaft 19 is coaxial with the shaft 3 and parallel to the shaft 13. The shaft 18 is rotatably supported in another bore 20 of the casing 1 by bearings 21 and 22.

As the engine rotates, the shaft 3 of the supercharger is driven by the power from the engine transmitted via the belt 11 and the dumper pulley 10, and rotation of the shaft 3 is transmitted to the shafts 13 and 18 by way of the gears 12a, 13a and 19 so that the F rotor and the M rotor rotate respectively. Upon rotation of these rotors, an external air is sucked into the supercharger from an inlet elbow (not shown) and is fed or supercharged into the engine from an outlet elbow (not shown).

A shaft seal 23 is located between the shaft 3 and the shaft bore 2, and an oil chamber 24 is defined between the shaft seal 23 and the bearings 4 and 5. An oil feed hole 25 which substantially vertically extends in the casing 1 is formed to supply an oil to the oil chamber 24. Specifically, the oil is fed from an oil pump (not shown) to the hole 25, the bearings 5 and 4 and the oil chamber 24 in turn. An upper end of the oil feed hole 25 opens to the air in the highest portion of the casing 1. At the lower end of the oil feed hole 25, provided is a nozzle 24a for directing the oil to the bearings 5 and 4 and in turn to the oil chamber 24.

In the illustrated conventional supercharger, however, the oil fed from the feed hole 25 is introduced to the bearings 4 and 5 and soon discharged from an exit formed in the casing 2 below the shaft 13 (not shown). Therefore, when the shaft 3 changes its rotational speed, the oil in the oil chamber 24 changes its surface level. As a result, a certain part 23a of the shaft seal 23 which slidably contacts the shaft 3 is occasionally exposed. If the part 23a of the shaft seal 23 is not merged or soaked in the oil pool, the oil is not fed to an interface between the shaft 3 and the part 23a of the seal 23. This may result in excessive and rapid wearing of the bearings 4 and 5 and the seal 23 as well as seizing/burning of the same.

SUMMARY OF THE INVENTION

One object of the present invention is to provide an oil feeding arrangement for a shaft seal and a bearing for always feeding a necessary amount of oil to the shaft seal as well as the bearing thereby eliminating the problems of the conventional arrangement.

According to one aspect of the present invention, there is provided an oil feeding arrangement which comprises a bearing located in a bore formed in a casing for rotatably supporting a shaft extending inside the casing, a shaft seal located in the bearing bore in contact with the shaft and spaced from the bearing in a longitudinal direction of the shaft, an oil chamber defined by the shaft seal and the bearing, an oil feed hole formed in the casing for directly feeding an oil into the oil chamber from an oil source, the oil being then directed to the bearing from the oil chamber, and a partition plate placed in the oil chamber which forms a gap between the shaft and itself (partition plate) for allowing part of the oil to flow to the bearing from the oil chamber through the gap and allowing the remainder of the oil to be dammed by the partition plate to form an oil pool in which the shaft seal is always immersed.

Since the oil supplied from the oil feed hole is partially dammed in the oil chamber by the partition plate and creates an oil pool, an interface portion of the shaft seal with the shaft is always immersed in the oil pool. Thus, burning of the shaft seal and the shaft is prevented. Also, a certain clearance is formed between the partition plate and the shaft so that a corresponding amount of oil is introduced to the bearing. Accordingly, the lubrication to the bearing is also assured.

The partition plate may have an annular shape and may be located to be coaxial with the shaft. The partition plate may have a contour similar to that of the bearing so that it is possible to locate both the partition plate and the bearing in the same shaft bore. More specifically, it is possible to insert the partition plate in the shaft bore and then place the bearing. Thus, the teaching of the present invention is easily applicable to the existing unit. This Facilitates manufacturing.

The partition plate slay be made from metal. The metallic plate has a high thermal transfer coefficient so that heat generated upon rotation of the shaft and itself is quickly and easily transferred. Thus, a cooling ability of the oil is properly maintained.

Other aspects, objects and advantages of the present invention will become apparent from the following detailed description and the appended claims as read with the accompanying drawings.

BRIEF DESCRIPTION OF THE ACCOMPANYING DRAWINGS

DETAILED DESCRIPTION OF PREFERRED EMBODIMENTS

Figure 1:
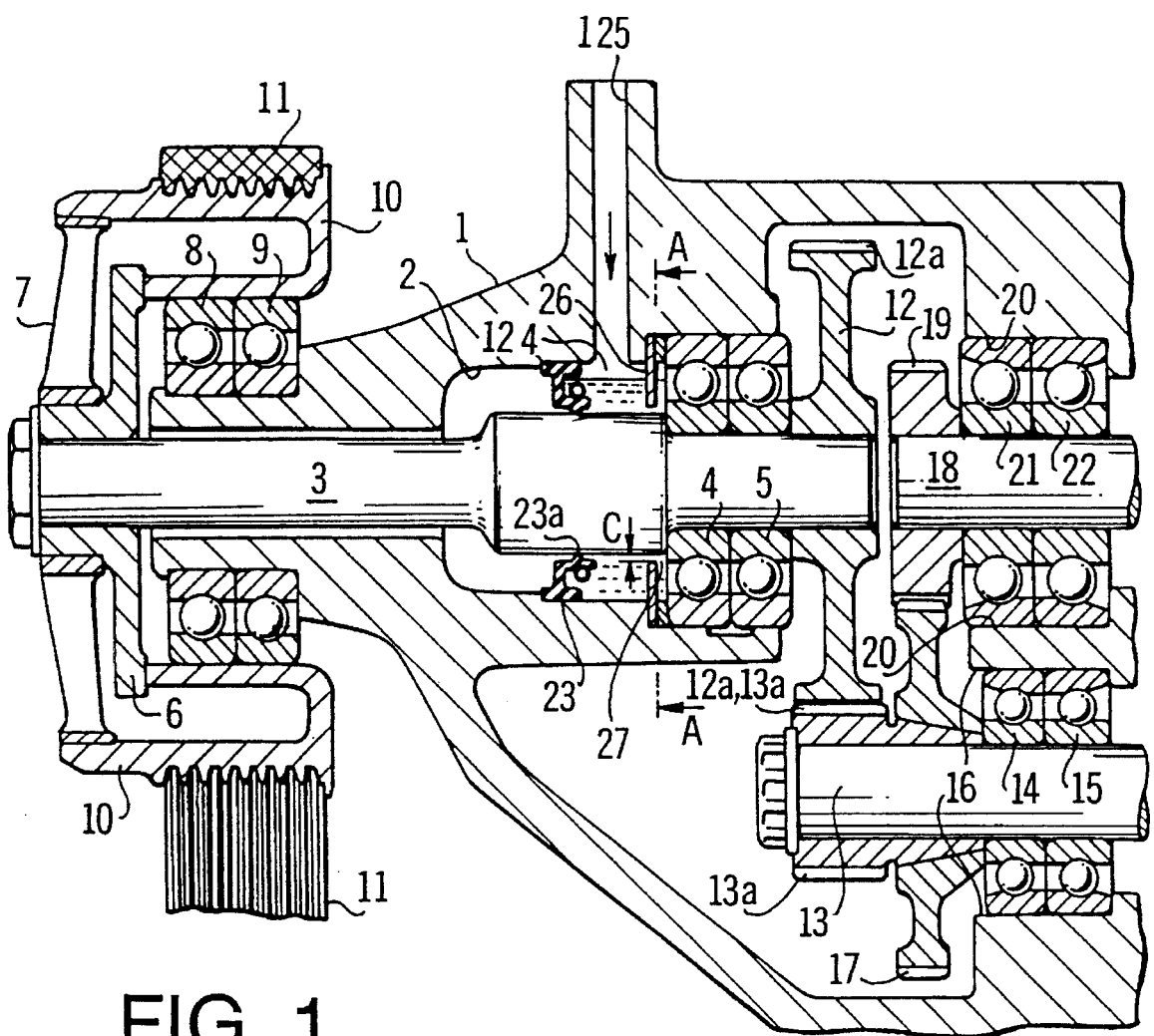
FIG. 1 is a partial section of a supercharger which incorporates an oil feeding arrangement for a shaft seal and a bearing according to the present invention.

Now, a preferred embodiment of the present invention will be described with reference to FIGS. 1 and 2 of the accompanying drawings. Same or like reference numerals as used in FIG. 3 are given to similar elements shown in FIGS. 1 and 2.

Referring to FIG. 1, a casing 1 has a shaft bore 2 in which a shaft 3 extends. The shaft 3 is supported at one end thereof by bearings 4 and 5. Between the shaft 3 and the shaft bore 2, provided is a shaft seal 23. The shaft seal 23 is spaced from the bearing 4 in the longitudinal direction of the shaft 3. An oil chamber 124 is formed by the shaft seal 23 and the bearings 4 and 5. An annular metallic plate 26 (FIG. 2) is placed in the oil chamber 124 in the vicinity of the bearing 4 in the longitudinal direction of the shaft 3. The annular metallic plate 26 may be an iron plate. The plate 26 is coaxial with the shaft 3. The annular plate 26 is spaced from the shaft 3 in a radial direction of the shaft 3. Therefore, between the shaft 3 and the partition plate 26, defined is an annular gap 27. The oil in the oil chamber 124 flows to the bearings 4 and 5 through the gap 27 and is discharged outside from an outlet (not shown). An oil feed bore 125 is vertically formed in the casing 1 and directly extends to the oil chamber 124. An oil is fed to the bore 125 from an oil pump (not shown) and directly introduced to the oil chamber 124. The location of the oil bore 125 is changed as compared with that of the oil bore 25 of the prior art since the bearings 4 and 5 need a relatively small amount of lubrication oil while the shaft seal 23 needs a relatively large amount of oil to avoid the burning or the like. It has been found that changing the location of the oil bore 125 (25) is not sufficient to insure the oil being always fed to the shaft seal 23. Accordingly, the partition plate 26 is provided.

As an engine rotates, an oil is supplied to the oil bore 125 from the oil pump (not shown) and is received in the oil chamber 124. The oil in the oil chamber 124 is dammed by the partition plate 26 so that a surface level of an oil pool in the chamber 124 is maintained at a certain high level while part of the oil is being introduced to the bearings 4 and 5 via the gap 27. If a constant amount of oil is introduced to the oil chamber 124 from the pump, a larger clearance C of the gap 27 prevents the surface level of the oil in the oil chamber 124 from raising relatively high. On the other hand, a smaller clearance C allows the oil to reach a relatively high level. Thus, the oil level can be controlled by the clearance C. Accordingly, is possible to always immerse the contact part 23a of the shaft seal 23 in the oil pool while feeding a particular amount of to the bearings 4 and 5.

As understood from the above, the exit of the chamber to the bearings 4 and 5 is limited to the gap 27. Therefore, the oil in the oil chamber 124 cannot easily flow the bearings 4 and 5 so that an appropriate depth of oil pool is maintained in the oil chamber 26. Thus, the shaft seal 23 is always provided with a sufficient amount of oil. At the same time, the gap 27 insures that a certain amount of oil is fed to the bearings 4 and 5 for lubrication. It should be noted that an amount of oil to be introduced to the bearings 4 and 5 may be relatively small, but in a real engine, the bearings 4 and 5 actually do not require a lot of lubrication oil.

Figure 2:
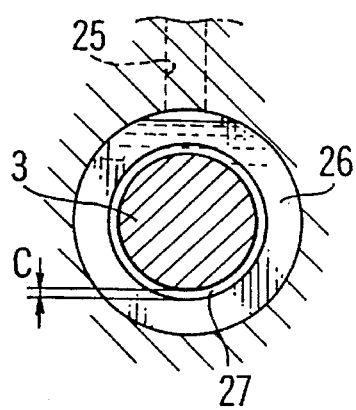
FIG. 2 illustrates a sectional view of the supercharger shown in FIG. 1 as taken along the line A—A.
Figure 3:
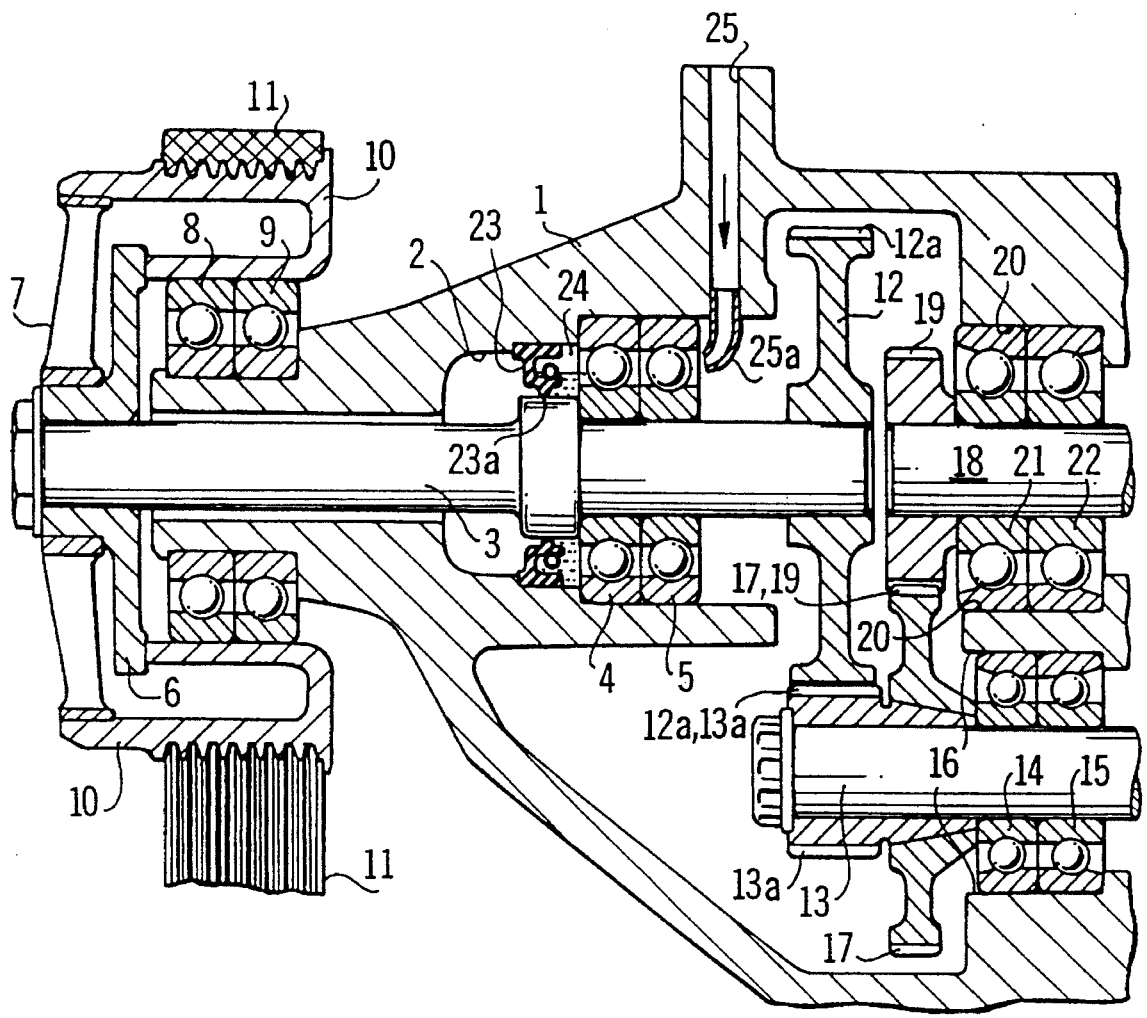
FIG. 3 illustrates a partial section of a conventional supercharger.

The partition plate 26 has an annular shape as illustrated in FIG. 2. Therefore, it is possible to locate the plate 26 inside the same bore 2 as the bearings 4 and 5 which also have a similar annular shape.

Further, since the plate 26 is made from metal, heat of the oil generated upon rotation of the shaft 3 is easily transferred to the casing 1 via the plate 26. This insures that the oil can appropriately cool the shaft 3 and the seal 23.

It should be noted that the present invention is not limited to the illustrated supercharger embodiment. The teaching of the present invention is applicable to any arrangement which includes a rotary shaft, a shaft seal and a bearing. Further, the configuration of the plate 26 is not limited to an annular one. The plate 26 may have another shape as long as it can insure that the shaft seal/shaft interface part is always soaked in the oil pool.

We claim:

1. An arrangement for feeding an oil to a bearing and a shaft seal respectively placed in a casing, comprising:

a bearing located in a bore formed in the casing for rotatably supporting a shaft extending inside the casing;

a shaft seal located in the bearing bore in contact with the shaft and spaced from the bearing in a longitudinal direction of the shaft, an oil chamber being defined by the shaft seal and the bearing;

an oil feed hole formed in the casing for directly feeding an oil into the oil chamber from an oil source, the oil being then directed to the bearing from the oil chamber; and partition plate placed in the oil chamber and spaced from the shaft in a radial direction of the shaft to form a gap between the shaft and itself in the radial direction for allowing part of the oil to flow to the bearing from the oil chamber through the gap and allowing the remainder of the oil to be dammed by the partition plate to form an oil pool in which the shaft seal is always immersed.

2. The arrangement of claim 1, wherein the partition plate has an annular shape and is placed in the same bearing bore as the bearing.

3. The arrangement of claim 2, wherein the partition plate is made from metal.

\* \* \* \* \*